United States Patent Office 3,264,641
Patented August 2, 1966

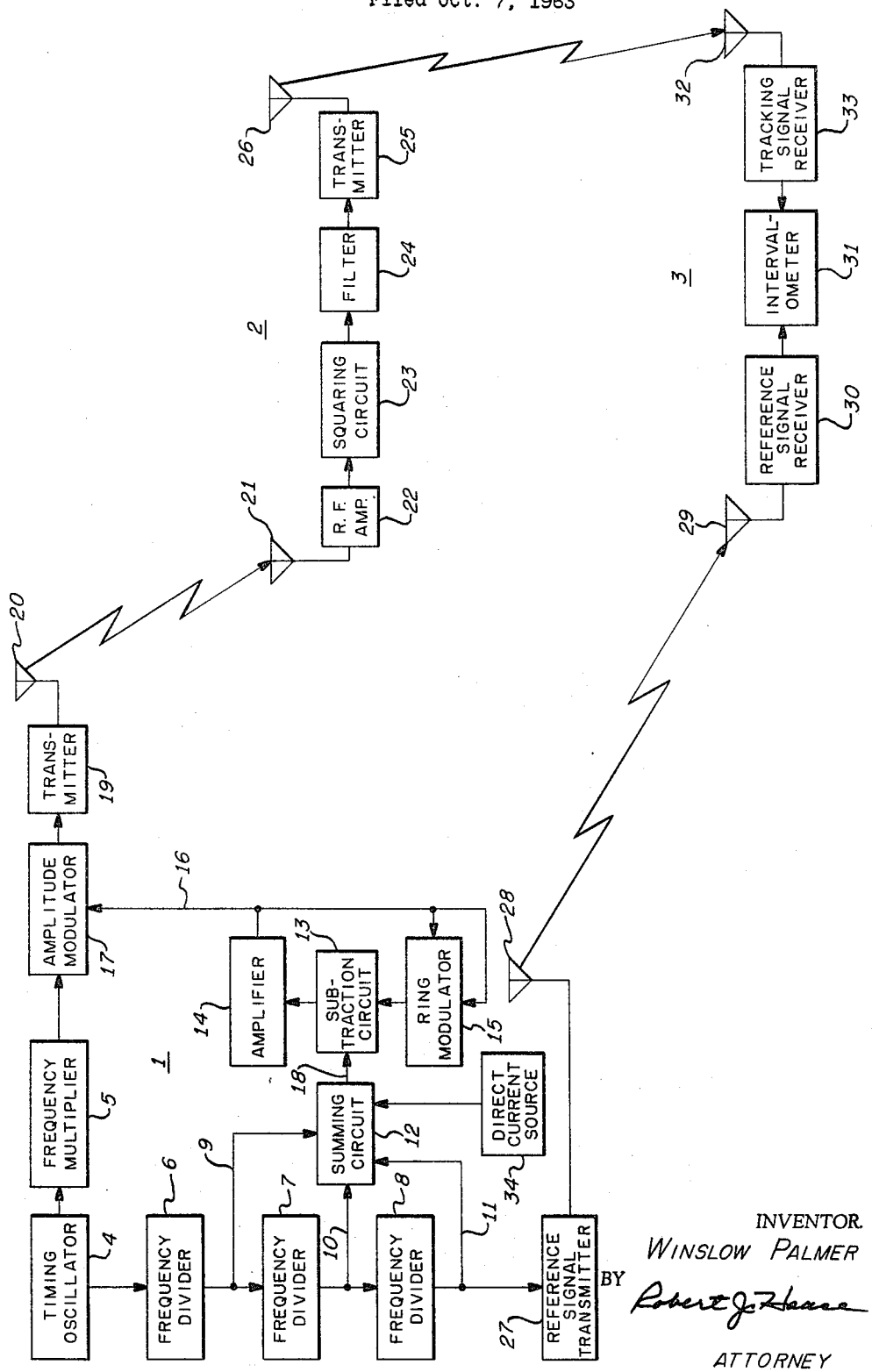

3,264,641
SQUARE LAW TRANSMITTER-TRANSPONDER SYSTEM
Winslow Palmer, Amityville, N.Y., assignor to Sperry Rand Corporation, Great Neck, N.Y., a corporation of Delaware
Filed Oct. 7, 1963, Ser. No. 314,252
5 Claims. (Cl. 343—6.5)

The present invention generally relates to radio transponder systems for ascertaining range or velocity or both and, more particularly, to a system of that type wherein specially amplitude modulated carrier waves are operated upon by a simple square law transponder to produce signals representing the range and velocity of the transponder.

Radio transponder systems utilizing continuous carrier wave transmissions may be advantageously employed to determine range and/or velocity over relatively great distances. One exemplary instance is the tracking of long range missiles. A ground transmitting station emits an amplitude modulated continuous wave carrier signal toward a transponder carried by the missile being tracked. Several separate ground tracking stations receive the signals returning from the missile transponder and measure the Doppler frequency shift of the carrier to obtain missile velocity information and measure the phase of the carrier modulation with respect to a reference timing signal to obtain missile range information.

Certain criteria must be satisfied in the design of the missile transponder equipment. Naturally, it is desirable that the transponder apparatus be simple, reliable, compact and require a minimum of power. It is also necessary that the signal returned by the transponder be easily distinguished at the tracking stations from the signal radiated by the transmitting station. It is convenient that the transponder shift the carrier frequency of the signal it receives from the transmitting station to facilitate the required signal identification.

If a conventional amplitude modulated continuous wave carrier signal is transmitted, the task of shifting the carrier frequency without disturbing the modulation components ordinarily would require that the transmitted signal be demodulated, the carrier component be shifted in frequency by a known amount, and the shifted frequency carrier be remodulated to produce the transponder reply. It is clear that resort to the foregoing prior art techniques would result in a relatively complicated arrangement and increase the possibility of frequency or phasing errors being introduced by the transponder.

One object of the present invention is to provide a transmitter-transponder system utilizing amplitude modulated continuous wave carrier signals wherein the transponder is characterized by simplicity, reliability, compactness and freedom from frequency or phase instability.

Another object is to provide an amplitude modulated continuous wave transmitter-transponder system wherein the transponder is adapted to shift the carrier frequency of the transmitted signals without requiring demodulation and without introducing phase distortions in the modulation components.

An additional object is to provide a simplified transponder for directly producing an amplitude modulated signal in response to a similar signal without requiring demodulation.

A further object is to provide means for generating a specially amplitude modulated continuous wave signal which when operated upon by a simple device is shifted in carrier frequency but may be readily demodulated without phase error by conventional techniques.

These and other objects of the present invention, as will appear from a reading of the following specification, are achieved in a preferred embodiment by the provision of a ground transmitter, a transponder and a ground tracking receiver. The transponder is carried by a vehicle, such as a missile, whose range and velocity are to be determined. The function of the transponder is to shift the carrier frequency of the transmitted signal and transmit the shifted frequency signal to the tracking receiver. The transmitted signal comprises a continuous wave carrier amplitude modulated by signals representing the square root of a desired modulating function. The transponder is equipped with a square law device which doubles the carrier frequency and squares the modulating function of the transmitted signal without altering the phase of the modulating function. Thus, the transponded signal is a continuous wave carrier signal amplitude modulated directly in accordance with the desired modulation function. The tracking receiver determines the range and velocity of the transponder-missile by making measurements on the modulation and carrier components, respectively, of the transponder signal.

For a more complete understanding of the present invention, reference should be had to the following specification and to the sole figure which is a simplified block diagram of a typical embodiment.

Referring to the sole figure, the reference numerals 1, 2 and 3 generally represent, respectively, the ground transmitting station, the vehicle-borne transponder and the ground tracking station of a typical system for measuring the position and velocity of the transponder vehicle. In the ground transmitting station, oscillator 4 produces a timing signal at a frequency intermediate the carrier frequency transmitted by the station and the modulation signals which amplitude modulate the carrier. The signal from oscillator 4 is applied to frequency multiplier 5 and to frequency divider 6. The frequency divided signal at the output of divider 6 is further reduced in frequency by cascaded frequency dividers 7 and 8 to provide on lines 9, 10 and 11 three harmonically related signals. In one illustrative case, each of dividers 6, 7 and 8 divides its respective input signal frequency by a factor of five. The three harmonically related signals are additively combined in summing circuit 12 and are applied to a first input of subtraction circuit 13.

Circuit 13 is one element of a closed signal loop comprising circuit 13, amplifier 14 and ring modulator 15. The output signal generated by the closed loop is applied by line 16 to amplitude modulator 17 which also receives the frequency multiplied signal at the output of multiplier 5. The desired amplitude modulating function which is to be recovered at the ground tracking station 3 appears on line 18 at the output of summing circuit 12. The signal generated on line 16 actually represents the square root of the modulating function represented by the signals on line 18. Thus, the signal at the output of multiplier 5 is amplitude modulated in amplitude modulator 17 in accordance with the square root of the desired modulating function. The amplitude modulated signal is amplified in transmitter 19 and radiated via antenna 20 toward transponder 2.

As is well understood in the art, a ring modulator is a device receiving two input signals and producing one output signal representing the instantaneous product of the two input signals. If the same signal $E(t)$ is applied to both inputs as is the case with ring modulator 15, then the ring modulator output signal represents the square of the input function $E^2(t)$. Inasmuch as the output of amplifier 14 is equal to its input multiplied by amplifier gain A, and the input to amplifier 14 is the difference between the desired modulated function $M(t)$ and the squared output function $E^2(t)$, the closed loop comprising circuit 13, amplifier 14 and ring modulator 15 must satisfy the relationship $$\frac{E(t)}{A} = [M(t) - E^2(t)]$$

Rearranging the terms yields:

$$E(t) = \pm \sqrt{M(t) - \frac{E(t)}{A}}$$

As the gain A of amplifier 14 is made large, the quantity $$\frac{E(t)}{A}$$

becomes negligible and the closed loop output on line 16 approaches the square root of the input on line 18, i.e., $E(t) = \pm\sqrt{M(t)}$. In other words, the closed loop circuit produces a wave whose instantaneous amplitude is the square root of the desired modulating function $M(t)$. In order to avoid the possibility of a negative square root, it is only necessary that the desired modulating function $M(t)$ include, in addition to the three harmonically related signals on lines 9, 10 and 11, a constant signal of such magnitude that the total of the constant signal and the harmonically related alternating signals never assumes a negative value. The constant signal is provided by direct current source 34.

The signal transmitted by antenna 20 may be represented by the expression $\sqrt{M(t)} \cos W_0 t$. The transmitted signal is received by antenna 21, amplified in R.F. amplifier 22 and operated upon by squaring circuit 23. Squaring circuit 23 is a nonlinear element whose output can be represented by a power series of the form $$E_{out} = a_0 + a_1 e_1 + a_2 e_1^2 + a_3 e_1^3 \pm \ldots$$

where $$e_1 = M(t) \cos W_0 t$$

The contribution to the total output by the second order term is of the form $a_2 M(t)(\frac{1}{2} + \frac{1}{2} \cos 2W_0 t)$. Other order terms of the power series may be generated but if the non-linear element is predominantly square law, the contributions by the higher order terms are not significant. A suitable non-linear element is a full wave rectifier having diode elements operated within the parabolic curvature region of their transfer characteristics. By inspection of the second order term, it will be observed that the process of squaring the received signal produces an output signal having a carrier frequency twice that of the received signal amplitude modulated by a function which is the square of the function modulating the received signal. It should also be noted that no phase error terms are introduced in the squaring process so that the phase of the modulation components of the transponder signal may be relied upon for range data. Therefore, the simplicity of the transponder apparatus is not detracted from by the introduction of spurious modulation components that would interfere with the intended purposes of the transmitter-transponder range-velocity measuring system. The second order term of interest at the output of squaring circuit 23 is extracted by filter 24, amplified by amplifier 25 and radiated by antenna 26 toward ground ranging receiver 3.

In order to determine the position of the transponder vehicle in space, the signal transmitted from the transponder vehicle is received at several widely separated ground ranging stations typified by station 3 where the time of arrival of the transponder signal is measured with respect to a timing reference signal received from the ground transmitter 1. The timing reference signal conveniently may be derived from the output of divider 8 and used to pulse modulate a carrier wave within transmitter 27. The pulse modulated reference signal is radiated via antenna 28 toward tracking station 3. The reference signal is received by antenna 29, demodulated by receiver 30 and applied to a first input of intervalometer 31. The transponded signal is received by antenna 32, demodulated by receiver 33 and applied to the other input of intervalometer 31. The function of intervalometer 31 is to measure accurately the phase or time difference between the reference signal received from the ground tracking station and the data signal received from the missile-transponder. Said phase difference is a function of the difference between the path lengths traversed by the reference signal and the data signal. It is to be noted that the data signal path includes the distance between the ground transmitting station and the transponder-vehicle as well as the distance between the transponder-vehicle and the ground tracking station. Inasmuch as the distance between the ground transmitting station and the ground tracking station is known, the distance of the missile-transponder from the ground tracking station can be computed readily.

As discussed previously, the data signal transmitted by the transponder is a continuous wave carrier signal amplitude modulated by a plurality of harmonically related modulating signals. Three modulating signals are shown in the disclosed embodiment by way of example. The frequency of the lowest frequency modulating signal is equal to the repetition rate of the pulse modulated reference signal radiated via antenna 28 because both the pulse modulating signals and said lowest frequency modulating signal are derived from the output of the same frequency divider 8. Tracking signal receiver 33 demodulates the signal received from the transponder to produce a pulsed output signal for application to intervalometer 31 having a recurrence rate equal to that of the lowest frequency modulating signal and having all of the timing precision of the high frequency carrier component of the received signal. A receiver suitable for use as tracking receiver 33 is disclosed in patent application S.N. 188,122 entitled "Timing Signal Receiver," filed on April 17, 1962, in the name of the present inventor and assigned to the present assignee, now Patent No. 3,117,280, issued January 7, 1964. Intervalometer 31 may be any conventional pulse time difference measuring device such as provided in a standard loran receiver.

In order to determine the speed of the transponder-vehicle relative to the ground stations it is only necessary to measure the frequency of the carrier of the data signal received from the transponder. The frequency shift of the received data signal carrier from the known carrier frequency of the signal transmitted by station 1 is a direct measure of missile speed in accordance with well-known Doppler principles. Any conventional Doppler signal determining instrument may be employed to measure the aforesaid frequency shift.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:
1. A system comprising a transmitter and a transponder;
   said transmitter comprising
      a source of carrier signal,
      a source of amplitude modulating signal,
      means coupled to receive said modulating signal for producing an output signal having an instantaneous amplitude representing the square root of said modulating signal,
      amplitude modulating means coupled to receive said carrier signal and said output signal, said output signal amplitude modulating said carrier signal,
      and means for transmitting the amplitude modulated carrier signal;
   said transponder comprising
      means for receiving said amplitude modulated carrier signal,
      a non-linear element coupled to the output of said receiving means for generating a signal having a component at twice the carrier frequency of the received signal, filter means for extracting said component, and means for transmitting the extracted component.

2. A system as claimed in claim 1 wherein said non-linear element has a substantially square law signal transfer characteristic.

3. A system comprising a transmitter and a transponder;

said transmitter comprising a source of carrier signal, a source of amplitude modulating signal, said modulating signal having an instantaneous amplitude representing the square root of a desired modulating function, amplitude modulating means coupled to receive said modulating signal and said carrier signal, said modulating signal amplitude modulating said carrier signal, and means for transmitting the amplitude modulated carrier signal;

said transponder comprising means for receiving said amplitude modulated carrier signal, a non-linear element coupled to the output of said receiving means for generating a signal having a component at twice the carrier frequency of the received signal, filter means for extracting said component, and means for transmitting the extracted component.

4. A system comprising means for generating an amplitude modulated carrier signal, the envelope of said carrier signal representing the square root of a desired modulating function, means including a non-linear element adapted to receive said amplitude modulated carrier signal for producing a signal component having a carrier frequency twice that of the received signal and an envelope directly representing the modulating function, and filter means for extracting said signal component.

5. Signal generating means comprising a source of carrier signal, a source of amplitude modulating signal, means coupled to receive said modulating signal and producing an output signal having an instantaneous amplitude representing the square root of said modulating signal, and amplitude modulating means coupled to receive said carrier signal and said output signal, said output signal amplitude modulating said carrier signal.

References Cited by the Examiner

UNITED STATES PATENTS

| 2,436,846 | 3/1948 | Williams | 343—6.5 |
| 2,674,692 | 4/1954 | Cutler | 325—9 X |
| 3,079,557 | 2/1963 | Crabtree | 343—6.8 X |

CHESTER L. JUSTUS, *Primary Examiner.*

P. M. HINDERSTEIN, *Assistant Examiner.*